United States Patent [19]

Barzuza

[11] Patent Number: 4,929,363

[45] Date of Patent: May 29, 1990

[54] METHOD FOR FILTERING A FLUID

[75] Inventor: Ytzhak Barzuza, Petach Tikva, Israel

[73] Assignee: Filtration L.T.D., Herzlia, Israel

[21] Appl. No.: 157,873

[22] Filed: Feb. 19, 1988

[30] Foreign Application Priority Data

Feb. 27, 1987 [IL] Israel ............................................ 81713

[51] Int. Cl.⁵ .............................................. B01D 37/04
[52] U.S. Cl. ..................................... 210/741; 210/808; 210/111
[58] Field of Search ............... 210/111, 741, 778, 794, 210/795, 798, 808, 103, 108, 137, 143

[56] References Cited

U.S. PATENT DOCUMENTS

| | | | |
|---|---|---|---|
| 3,826,368 | 7/1974 | Walters | 210/108 X |
| 4,151,080 | 4/1979 | Zuckerman et al. | 210/111 X |
| 4,187,175 | 2/1980 | Roberts et al. | 210/108 X |
| 4,207,181 | 6/1980 | Drori | 210/111 |
| 4,571,302 | 2/1986 | Willson | 210/111 X |
| 4,618,431 | 10/1986 | Hindman et al. | 210/111 X |

FOREIGN PATENT DOCUMENTS 59-206017  11/1984  Japan .................................... 210/808

*Primary Examiner*—Tom Wyse
*Attorney, Agent, or Firm*—Sandler & Greenblum

[57] ABSTRACT

A method for filtering a fluid in a filter system, including a filter housing and a filter element, which method comprises modifying filter throughput in such a way that differential pressure across the filter system caused by build-up of filter cake is substantially maintained at a predeterminable level for at least part of filter-operation time between flushings. A filter system for a fluid for operation by the method is also described.

10 Claims, 1 Drawing Sheet

METHOD FOR FILTERING A FLUID

The present invention relates to a method for filtering a fluid. It also relates to a filter system for operation by the method.

Fluid filters usually consist of a permeable element such as a perforated wall, a wire netting or the like, which is interposed between the filter inlet and outlet and on which the solids intercepted are deposited. After an initial period of filtration, a solids layer builds up, the so-called filter cake, which in itself not only constitutes a filter, but has a greater separation efficiency than the original element. i.e., is capable of retaining solids of a much smaller size than the original filter element. This filter cake constitutes, however, an obstacle to the fluid flow and produces a pressure drop or differential $\Delta p$ across the filter which, with increasing thickness of the filter cake, causes the latter to be compressed and the finer particles to be forced through the filter. When, due to excessive $\Delta p$, the filter has eventually to be cleaned, experience has shown the cleaning of such compressed filter cakes to be relatively expensive, both with regard to the time consumed and the amount of backflushing fluid required. Repeated exposure of filter elements to excessive forces is also liable to deleteriously affect service life of these elements.

It is one of the objects of the present invention to overcome the drawbacks of existing filtering methods and to provide a method of operating a filter system that, while facilitating the building up of the essential filter cake, will prevent the compression thereof and its concomitant negative effects as explained above.

This the invention achieves by providing a method for filtering a fluid in a filter system, including a filter housing and a filter element, comprising the step of modifying filter throughput in such a way that differential pressure across said filter system caused by build-up of filter cake is substantially maintained at a predeterminable level for at least part of filter-operation time between flushings.

The invention further provides a filter system for a fluid, comprising a fluid filter comprised of a housing and a filter element, sensor means adapted to detect a differential pressure across said filter as caused by build-up of filter cake, and valve means adapted to modify filter throughput as a function of said differential pressure.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
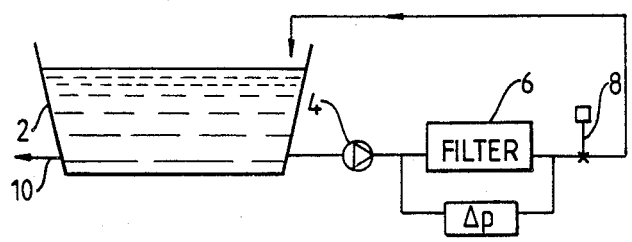
FIG. 1 is a schematic representation of a first embodiment of the invention, in which the entire pump output is passed through the filter.

Referring now to the drawings, there is seen in FIG. 1 a reservoir 2 from which a fluid, e.g., water, is drawn by a pump 4 and delivered to the filter 6, which is preferably of the screen type and advantageously equipped with one of the known automatic self-cleaning or back-flushing arrangements (not shown). Upstream of the filter 6, that is, in the filter output line, there is provided a valve 8 which, in a manner to be explained further below, is adapted to modify the throughput of filter 6. From the valve 8 the water is led back to the reservoir 2. The aim of the arrangement according to this embodiment is to continously clean a relatively small proportion, say, about 5% of the water turnover of the reservoir.

The filter 6 of this embodiment operates as follows:

At the onset of a filtering period (following backflushing which concluded the preceding period), the valve 8 is fully open. As filter-cake formation sets in, a pressure drop, or differential pressure $\Delta p$, develops across the filter. While in prior-art filter systems $\Delta p$ is permitted to grow, with the already mentioned result of filter-cake compaction and loss of fine particles, the present invention, although facilitating filter-cake growth prevents increase of $\Delta p$ beyond certain limits which, according to specific applications, typically vary between 0.02 and 0.4 bar. This is achieved by providing sensors monitoring the differential pressure $\Delta p$. As soon as $\Delta p$ increases beyond the presettable limit, the signal from these sensors causes the initially fully open valve 8 to begin to close, thereby reducing the filter throughput which, in effect, also reduces $\Delta p$, as $\Delta p$, everything else being equal, is also a function of throughput. There is thus provided a feedback loop, whereby every increase of $\Delta p$, caused by the growth of the filter cake, is counteracted and compensated for by a decrease in throughput. The valve 8 is, of course, not permitted to close fully, as this would eliminate filter action altogether. Instead, the filter flushing intervals are empirically set in such a way that $\Delta p$ will remain constant for a substantial proportion of the time between flushings, the assumption being that some increase in $\Delta p$ due to the cessation of throughput reduction will not greatly affect the filter cake. This proportion is of course a function of the solids load expected. Experience has shown that for light loads a constant $\Delta p$ for about 30% of the time between flushings gives satisfactory results. Heavier solids loads require of course a larger proportion. Maximum closure of the valve 8 can be set with the aid of e.g., microswitches, or by monitoring filter throughput using a flow-meter which, when throughput has reached a predetermined minimum, stops further closure of valve 8, or initiate a flushing cycle. Provision is also made for fully reopening the valve after completion of flushing, in preparation for the next filtering period. The consumer is served by pipeline 10 either by gravity or with the aid of another pump.

Figure 2:
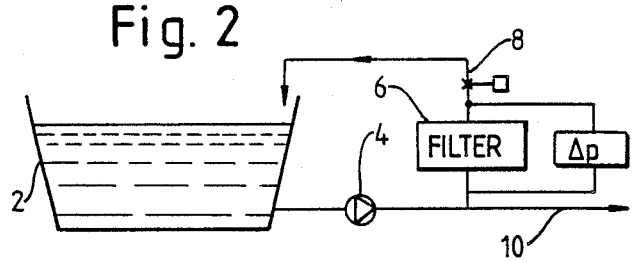
FIG. 2 is a similar representation of a second embodiment of the invention, in which only part of the pump output is passed through the filter.

FIG. 2 schematically illustrates a basically similar arrangement, except that the pump 4 also serves the consumer via line 10.

Figure 3:
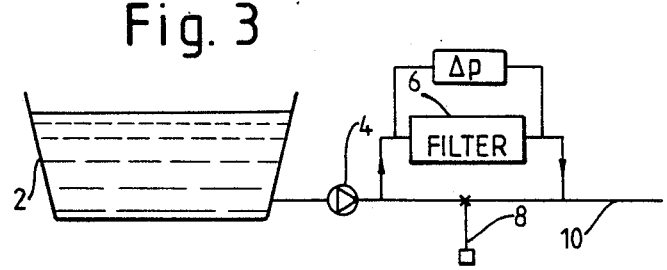
FIG. 3 is a schematic view of a third embodiment of the invention, in which the filter is located on a bypass to a line leading from the pump to the consumer, and FIG. 4 schematically shows a fourth embodiment, in which a relatively large reservoir is supplied with filtered fluid from a relatively small vessel.

In the embodiment of FIG. 3, the filter 4 is located on a line bypassing line 10 which leads from the pump 4 to the consumer. Here the filter-throughput modifying valve 8 is not interposed in the filter output line as in FIGS. 1 and 2, but in the consumer line 10, between the filter input and output lines which connect the filter 8 in parallel with the consumer line 10. As a consequence of this arrangement, the valve 8 which, in the embodiments of FIGS. 1 and 2, progressively closed down with increasing filter cake thickness, in order to keep $\Delta p$ substantially constant is here rigged in such a way that, starting from a minimal open position to facilitate minimum throughput, it will gradually open up with increasing filter-cake thickness, since progressive reduction of filter throughput, required to keep $\Delta p$ constant, is here obviously achieved by progressively increasing the flow through the consumer line 10.

Figure 4:
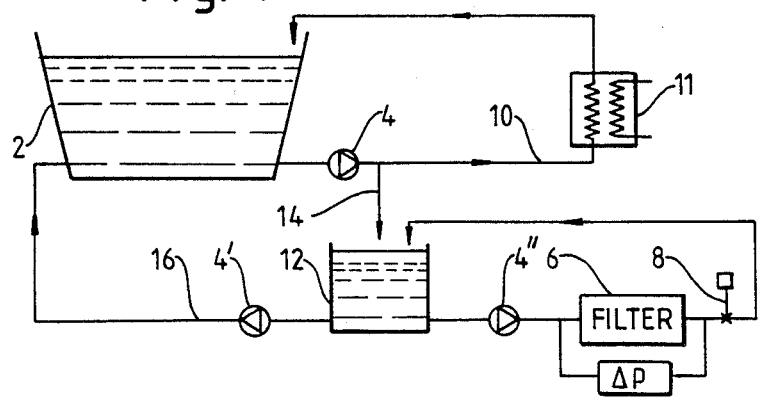

FIG. 4 represents a further embodiment, especially suited for removal of very small particles. There is seen a reservoir 2 from which the pump 4 delivers water to the consumer, for instance a heat exchanger 11, from which it returns to the reservoir 2. There is further seen a smaller vessel 12, into which vessel water is pumped by pump 4 via a feed line 14, and from which it returns to reservoir 2 via a return line 16 with the aid of another pump 4'. As can be seen, the vessel 12 is here a part of the filter system which comprises a pump 4", a filter 6 and the control valve 8. If the feed line 14 is so proportioned that its rate of delivery is, say, 1 m³/h, and if, on the other hand, the average throughput of the filter 6 is, say, 20 m³/h, then every cubic meter introduced into the vessel 12 has circulated through the filter 6 twenty times before being returned via line 16 to the reservoir 2, filtration being thus most intensive.

If the vessel 12 were closed, the pump 4' in return line 16 could be dispensed with.

It should also be understood that while the series arrangement of the filter 6 is the same as that used in the embodiment illustrated in FIG. 1, the same effect could be achieved with the bypass, parallel, arrangement of FIG. 3, the consumer line 10 being led back to the vessel 12.

From the description of the different embodiments it is clear that the method according to the invention is most advantageously used in closed-cycle applications, in conjunction with reservoirs which can compensate for the nonuniform output of the filter systems described, although open-cycle applications requiring moderate filter throughputs are quite feasible, for instance, purification of drinking water from roof-top tanks, or the removal, from seawater, of impurities such as algae, in preparation for desalination.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for filtering a fluid in a filter system, including a filter housing and a filter element, comprising the step of:
   modifying filter throughput in such a way that differential pressure across said filter system caused by build-up of filter cake is substantially maintained at a predeterminable level for at least part of filter-operation time between flushings.

2. The method as claimed in claim 1, wherein modifying said filter throughput consists in a reduction thereof.

3. The method as claimed in claim 1, wherein said predeterminable level of said differential pressure is higher than 0.02 bar and lower than 0.4 bar.

4. The method as claimed in claim 1, wherein said differential pressure is maintained constant for at least 30% of said filter-operation time.

5. The method as claimed in claim 1, comprising the further step of indicating the need for, or initiating, flushing.

6. A method for filtering a fluid in a filter system that includes a filter housing containing a filter element through which fluid is pumped, and throughput control means for controlling filter throughput, said method comprising the steps of:
   (a) detecting the differential pressure across said filter housing as a consequence of buildup of filter cake on said filter element; and
   (b) operating on said control means as a function of said differential pressure such that, after the differential pressure reaches a threshold, the differential pressure is maintained substantially constant.

7. A method according to claim 6 wherein said throughput control means includes valve means, and wherein the step of operating on said control means serves to change the setting of said valve means.

8. A method according to claim 7 including the step of gradually closing said valve means as the thickness of filter cake increases.

9. A method according to claim 7 including the step of gradually opening said valve means as the thickness of filter cake increases.

10. A method according to claim 6 wherein said differential pressure threshold is in the range of about 0.02 to 0.4 bar.

* * * * *